Aug. 22, 1967  T. A. ROGERS  3,336,985
VIBRATING PLOW

Filed Nov. 30, 1964

THELMER A. ROGERS
INVENTOR.

BY: *C. W. Coffee*
   ATTY.

Aug. 22, 1967 T. A. ROGERS 3,336,985
VIBRATING PLOW
Filed Nov. 30, 1964 3 Sheets-Sheet 2

THELMER A. ROGERS
INVENTOR.

BY: C. N. McAfee
Atty

Aug. 22, 1967 T. A. ROGERS 3,336,985
VIBRATING PLOW
Filed Nov. 30, 1964 3 Sheets-Sheet 3

THELMER A. ROGERS
INVENTOR.

BY

United States Patent Office 3,336,985
Patented Aug. 22, 1967

3,336,985
VIBRATING PLOW
Thelmer A. Rogers, P.O. Drawer 1589,
Lubbock, Tex. 79408
Filed Nov. 30, 1964, Ser. No. 414,659
4 Claims. (Cl. 172—40)

ABSTRACT OF THE DISCLOSURE

A plurality of subsoiling plows attached to a tool bar resiliently are vibrated with an eccentric weight attached to each shank. The eccentric weights are attached to a cable and the weights are timed so that the resulting vibration transmitted to the tool bar is out of phase. The flexibility of the cable permits each tool shank to vibrate independently.

---

This invention relates to vibrating plows and more particularly to a system for vibrating a plurality of plows on a single tool bar with a minimum of vibration transmitted from the tool bar to the supporting implement.

The advantages of vibrating plows to improve their penetration and tillage and to reduce the draft is known. However, most of the systems in commercial use today embody a vibrator attached to the frame of the plow vibrating the entire frame. This is disadvantageous particularly if the frame is connected directly to the tractor by use of a three point hitch, a common type of attachement.

A solution to this problem is that each of the individual plow shanks can be vibrated independently of the tool bar to which it is attached. Therefore, by phasing the relationship of the vibrations of the individual shanks, the result of the vibration upon the tool bar can be greatly reduced if not eliminated altogether. I.e., the combination of all the shanks can be "balanced" much the same as the pistons of a multi-cylindered engine are balanced so that the tool bar as a whole has no vibrations transmitted from it to the tractor.

An object of this invention is to provide a vibrating plow.

Another object is to provide a vibrating plow that reduces the vibration transmitted to the frame.

Another object is to provide a vibrating plow which transmits little or no vibration into the frame so that it may be connected directly to a tractor.

Further objects are to achieve the above with a device that is sturdy, compact, durable, simple, versatile, and reliable, yet inexpensive and easy to manufacture and operate.

The specific nature of the invention as well as other objects, uses, and advantages thereof will clearly appear from the following description and from the accompanying drawing, the different views of which are not necessarily to the same scale, in which.

Figure 1:
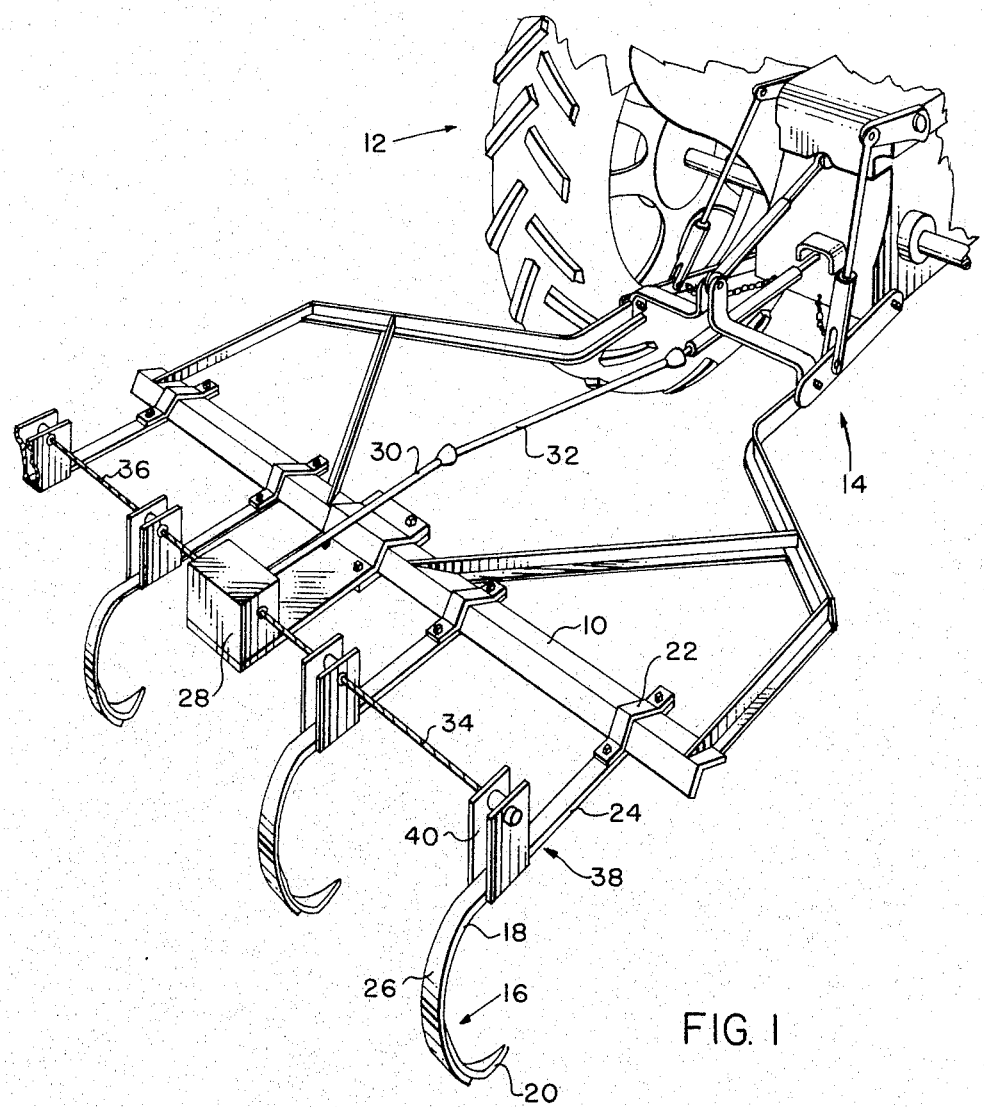
FIG. 1 is a perspective view of an implement according to this invention attached to a tractor.

Referring more specifically to the drawing, it may be seen that tool bar 10 is attached to tractor 12 by conventional three point hitch 14. Therefore, the tool bar is directly attached to the draft means for pulling the plows 16. The plows are represented in FIG. 1 as having spring steel shanks 18 with points 20 thereon. One end of each spring steel shank 18 is attached to the tool bar 10 by clamp 22. The shanks have a horizontal portion 24 extending from the clamp rearwardly where they curve downward in a curved portion 26 which has the plow point 20 on the bottom thereof. Such spring steel shanks are well known to the art and will have a tendency to vibrate naturally in the process of tilling the ground.

That which has been described above is conventional and well known to the art.

Gear box 28 is attached to the tool bar 10 at the center thereof. The gear box has shaft 30 which extends forward through universal slip joint 32 to the power takeoff of the tractor 12. The gear box has wire rope 34 extending from the right side thereof and a second wire rope 36 extending to the left side thereof. The wire ropes 34 and 36 are laid to the right and left hand so that as torque is transmitted through them they do not tend to become unwound. I prefer to use wire ropes as the torsion transmission element because they are stretchable and flexible. The gear box 28 contains therein means for rotating the wire ropes 34 and 36 responsive to rotation of the shaft 30. The wire ropes 34 and 36 rotate as a unit and may be connected within the gear box 28.

U-shaped bracket 38 is attached to each of the shanks 18 on the top thereof and spaced away from the drawbar 10. The horizontal portion 24 of the shank forms a resilient link between the bracket 38 and the drawbar 10. This portion 24 of the shank 38 is in the form of a flat, horizontal leaf spring. The brackets have upstanding ears 40 which have holes through the upper portion thereof. The wire rope 34 and 36 are journalled through the holes. Sleeve 42 is telescoped over the wire rope at each bracket and the sleeve is securely attached to the wire rope either by crimping the sleeve or by filling the space between the sleeve and wire rope with soft metal such as lead. Eccentric weight 44 is attached to each sleeve. The weights 44 are placed in different positions for adjacent brackets.

Figure 2:
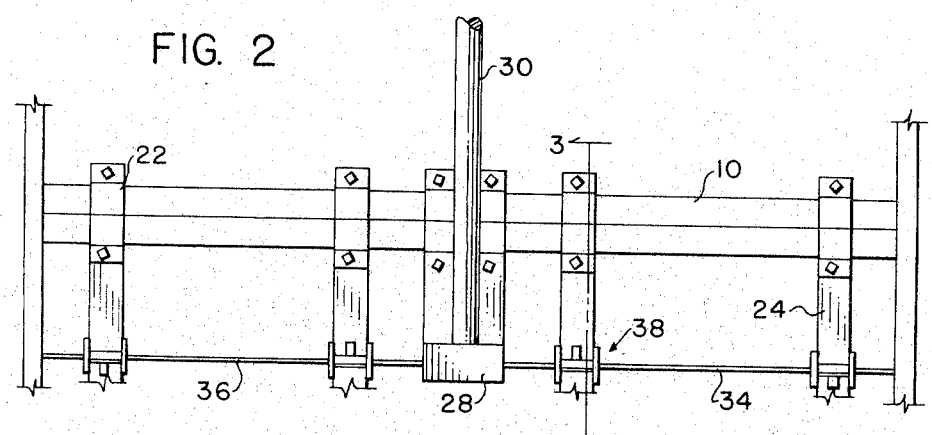
FIG. 2 is a plan view showing the tool bar assembly in greater detail.
Figure 3:
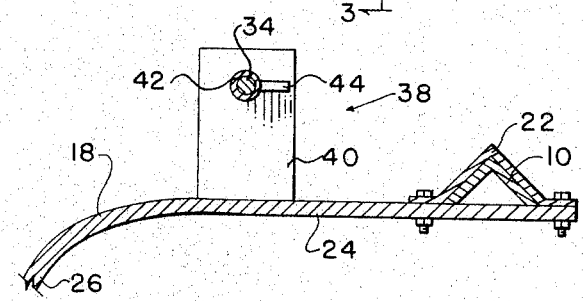
FIG. 3 is a cross sectional view taken on line 3—3 of FIG. 2.
Figure 4:
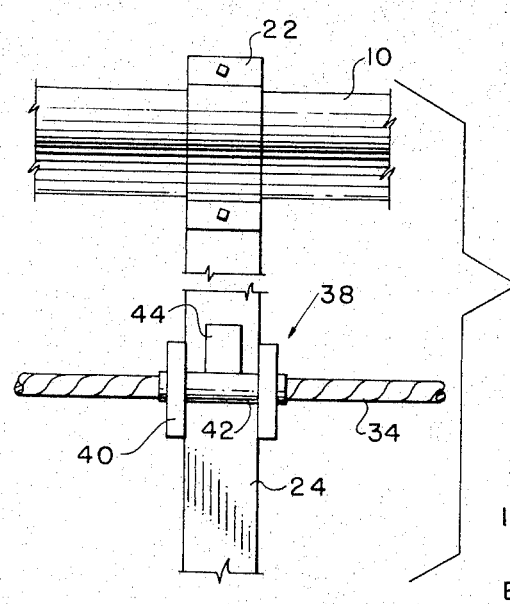
FIG. 4 is an enlarged partial plan view illustrating one shank with its associated vibrator.

Referring more particularly to FIG. 2, it may be seen there are four shanks to the draw bar and that the weights on the end shanks are to the rear and the weights on the middle shanks are forward. Analysis will show that if the rope rotates as a unit, that the vibrational forces as transmitted to the tool bar 10 will cancel out so that there is not resultant vibration. Stated otherwise, the sum of the vibrational forces of all of the eccentric weights is less than the vibrational force of any one weight. Each of the eccentric weights are approximately equal and are disposed at an equal throw or distance from the center of the sleeve and therefore the center of their axis of rotation. Therefore, it may be seen that each of the shanks are vibrated with an additional vibration and this vibration is not transmitted to the tool bar 10. It is necessary that the wire ropes 34 and 36 be flexible inasmuch as one shank will be moving upward while its adjacent shank is moving downward. Inasmuch as the plane of vibration of each shank is fixed at right angles to the axis of the tool bar 10, the distance between the brackets will change slightly. Therefore, it is also necessary that the wire ropes 34 and 36 be stretchable, a characteristic of wire rope.

Figure 5:
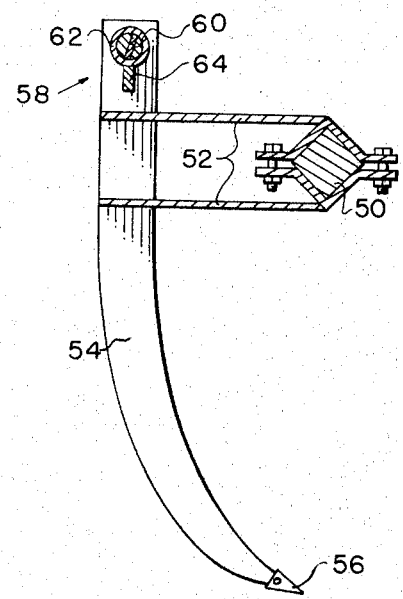
FIG. 5 is a sectional view similar to FIG. 3 illustrating a second embodiment.

Referring to FIG. 5, there is illustrated a modification. In this illustration, the tool bar 50 has attached to it two leaf springs 52 which are horizontal flat springs. These leaf springs extend rearwardly from the tool bar 50. At the rear end thereof they have a rigid vertical shank 54 which is generally vertically oriented. The shank has plow point 56 located on the bottom thereof. At the top of the rigid shank 54, is located a U-shaped bracket 58.

In this instance, the flexible, stretchable torsion transmission element is in the shape of a flat twisted steel ribbon 60. The sleeve 62 is journalled within the holes of the bracket 58 and the sleeve 62 is attached to the ribbon 60 by filling the space between the ribbon and the sleeve with a filler material such as lead. It will be understood that in the modification that a plurality of shanks 54 are attached to the tool bar 10 and the eccentric weights 64 attached to the sleeves would be timed thereon to reduce or eliminate any vibration within the tool bar.

Figure 6:
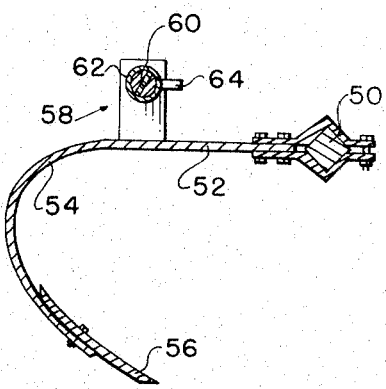
FIG. 6 is a sectional view of a third embodiment of this invention.
Figure 7:
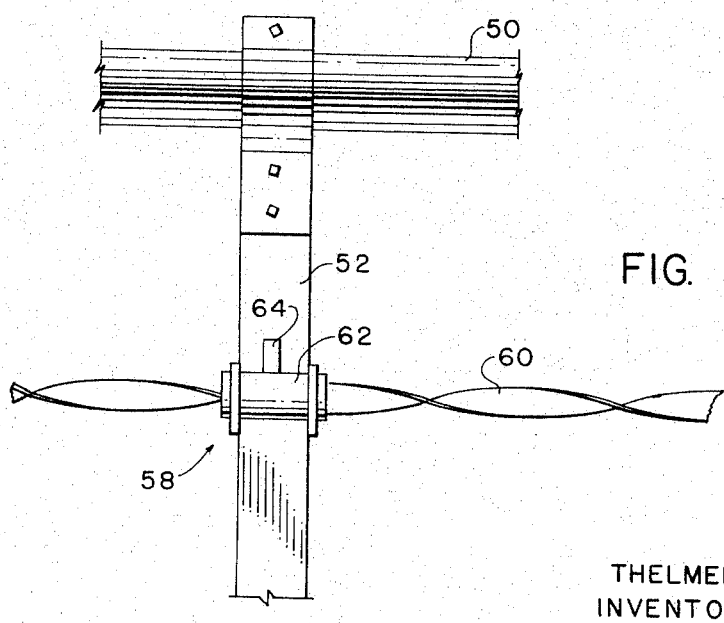
FIG. 7 is a partial plan view of the third embodiment.

FIGS. 6 and 7 illustrate an embodiment having spring shanks 18 and twisted ribbon 60 as the flexible, stretchable torsion transmission element.

It will be apparent that the embodiments shown are only exemplary and that various modifications can be made in construction, materials, and arrangement within the scope of the invention as defined in the appended claims:

I claim as my invention:

1. In an earth working implement having
  (a) a horizontal tool bar normal to the direction of draft,
  (b) a plurality of plows attached to the tool bar,
  (c) draft means attached to the tool bar for pulling the plows, and
  (d) means for regulating the depth the plow will enter the soil:
  the improvement comprising:
  (e) a bearing attached to each plow,
  (f) each plow attached to the tool bar with a resilient link between said bearing and tool bar,
  (g) an eccentric weight journalled in each bearing, and
  (h) a stretchable, flexible torsion transmission element connecting the eccentric weights,
  (i) drive means attached to said transmission element for rotating same,
  (ii) said eccentric weights being in different rotational positions on said transmission element so as to balance the vibration and reduce the vibration transmitted to the tool bar so that the tool bar as a whole does not transmit vibration to the draft means.

2. The invention as defined in claim 1 wherein
  (j) said stretchable, flexible torsion transmission element is a wire rope.

3. The invention as defined in claim 1 wherein
  (j) said resilient link is in the form of a flat, cantilever spring.

4. In an earth working implement having
  (a) a horizontal tool bar normal to the direction of draft,
  (b) a plurality of subsoiling plows attached to the tool bar,
  (c) draft means attached to the tool bars for pulling the plows, and
  (d) means for regulating the depth the plows enter the soil; the improvement comprising:
  (e) gear box attached to the tool bar,
  (f) a shaft extending forward from the gear box to the draft means for supplying power to the gear box,
  (g) a cable extending parallel to the tool bar to the right and left of the gear box from the gear box,
  (h) means in said gear box for rotating the cable responsive to rotation of the shaft,
  (j) brackets mounted on each subsoiling plows,
  (k) an eccentric weight attached to the cable within the bracket at each plow,
  (m) bearings between said cable and brackets for mounting the cable for rotation at each plow,
  (n) said eccentric weights adjacent plows being in different rotational positions on the cable so as to balance the vibration and reduce the vibration transmitted to the tool bar so that the tool bar as a whole does not transmit vibrations to the drafts means, and
  (o) said attachment of the plows to the tool bar including resilient means between each of said brackets and the tool bar.

References Cited
UNITED STATES PATENTS

| | | |
|---|---|---|
| 2,493,811 | 1/1950 | Graham. |
| 2,690,902 | 10/1954 | Ream. |
| 2,850,815 | 9/1958 | Edwards. |
| 3,211,236 | 10/1965 | Patton _____ 172—40 |

ABRAHAM G. STONE, *Primary Examiner.*

WILLIAM A. SMITH, III, *Examiner.*

J. R. OAKS, *Assistant Examiner.*